May 5, 1942.   A. H. SMITH   2,281,604
CONTAINER FOR HOLDING LIQUID UNDER PRESSURE
Filed April 24, 1936

INVENTOR.
Allyne H. Smith
BY Edward Thomas
his ATTORNEY.

Patented May 5, 1942

2,281,604

UNITED STATES PATENT OFFICE 2,281,604

CONTAINER FOR HOLDING LIQUID UNDER PRESSURE

Allyne H. Smith, Columbus, Ohio, assignor to Aeration Processes, Inc., Columbus, Ohio, a corporation of Ohio Application April 24, 1936, Serial No. 76,136

8 Claims. (Cl. 221—74)

This invention relates to containers for holding liquid under pressure, and is herein illustrated in some detail as embodied in a device especially adapted for dispensing an aerated cream mix.

One form of aerated cream, known as whipped has been hitherto made by beating air into chilled cream. Such beating has usually not more than doubled the bulk of the cream even under favorable circumstances. The operation of whipping has been time-consuming and tiring. Mechanical whipping devices have aerated cream, usually to another consistency, and have required a substantial amount of time to properly whip the cream, thus requiring advance planning if the whipped cream was to be served at a given time, because the aerated cream might fall, or collapse if stored too long. Moreover, if overwhipped the cream often became butter. As a result cream whipping was a source of anxiety for the housewife and a source of trouble in the retail store where an aerated cream was dispensed over the counter, for example, when added to drinks.

The present invention provides a device for instantly serving or dispensing an aerated liquid food mix of any desired consistency, by storing the liquid under pressure with a gas soluble in the liquid. By mere release of pressure a stream of the desired aerated food liquid flows evenly from a nozzle, enabling a cook or dispensing clerk to deposit it at will and in any desired design or pattern by directing the issuing stream so as to build the design.

When nitrous oxide gas, laughing gas, is dissolved in the liquid in the container, a stable aerated cream mix of excellent consistency may be obtained with a volume of 375% or more, of the unaerated liquid.

The metal container shown is readily made by standard methods of drawing sheet metal and other operations, so as to be light in weight and yet strong enough to stand the considerable abuse such a container is subjected to in shipping and delivery. The container is well adapted to hold the gas by one of the standard check-valves used on automobile tires.

The detachable nozzle, shown as the one through which the aerated liquid is delivered from the valve, is well adapted to be made, for the most part by usual die-casting procedures. When the nozzle is removed the valve passage may be closed by a usual tire valve dust cap.

In the form shown the container cover carries the valve and is adapted to rest upon the upper edge of the container body with a standard rubber gasket, the outer face of the upper edge being threaded so that a holding ring may be screwed down on to the body to hold the cover in place, thus adding to the ability of the container to stand abuse.

Other features and advantages will hereinafter appear.

Figure 1:
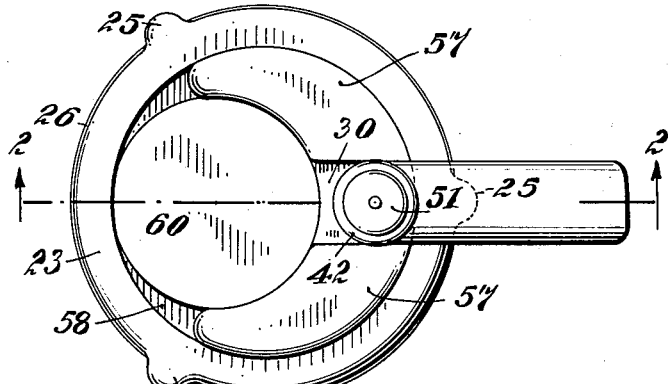
Figure 1 is a top view of the container with delivery nozzle in place.

The body 10 of the container shown is drawn from sheet metal to have in its bottom a central circular stiffening depression 11, and an outer annular depression 12 forming a base on which the container rests firmly by holding the center of the face of the depression 11 just clear of a line across the projection 12.

The depression 12, in this form simplifies the drawing operation and is nearly equivalent to the three knobs which would form a three-point support of a Bakelite container, for example.

The container body 10 is shown as an upright cylinder with its side 13 threaded around the outside of the top at 14 to be engaged by internal threads 15 on a ring 16 which draws down a nearly flat top or cover 17.

To close the joint between the flat top 18 of the side 13 and the annular flat bottom edge 19 of the cover 17 there is shown a thin annular rubber gasket 20 lying on the flat ledge 21 formed by the top 18 and its spun-over internal ledge. The gasket 20 is clamped firmly down against the ledge 21 by turning the ring 16 which is provided with a heel 23 overlying the flat rim 19 of the cover 17.

The metal ring 16 is easily rotated and may be tightened by grasping with a suitable wrench its stamped out U-shaped radial lugs 25, three being shown, thus enabling the ring 16 to be formed from sheet metal.

For convenience as a rest in adjusting the wrench the ring carries a lower heel 26, between the lugs 25, formed as an annular enlargement of the body of the ring 16. This heel is shown as deeper than the threads, so that the internal threads 15 begin where the heel bends and attain their full depth above the heel 26. As a result, when the ring 16 is laid on the rim 19, the flange of the ring 16 below the heel 26 tends to seat the threads 15 easily on the threads 14, thus avoiding damage of the threads by carelessness in sealing the ring. With this construction the threads 15 are adequate even though they are so shallow that they are interrupted at each lug 25.

The flat top or cover 18 carries a valve 27 which has been found satisfactory in aerating liquids if it is one standard form of Shrader type valve.

In the form shown the valve body passes through the wall of a depressed boss 30 of the cover 17 so that the valve body projects within the container and is held by an inner nut 31 and an outer nut 32 screwed on the outer face of the valve against the inner and outer faces of the cover 17.

The seat-carrying member or support 33 of the valve is screwed down on the internal thread 34 of the valve body 28 so as to position the seat 35 against the gasket 36 on the plunger 37. The plunger 37 is pressed up against the seat 35 by a spring 38 which bears against an interrupted collar 39 resting against the annular shoulder 40 of the internal collar 41.

When the container is used for delivering aerated liquid cream mix a special nozzle 42, having a slightly enlarged bottom opening 43 is set over the upwardly projecting valve stem 44 to center it, and then it is turned so that its internal thread 45 beginning above the opening 43 seizes the valve body and draws it down.

The liquid is released by depressing a plunger 46 sliding vertically in the top of the nozzle 42 to depress the stop of the valve plunger stem 47, depressing the plunger 37. This permits gas or liquid to flow upwardly through the opening in the collar 41, between the plunger 37 and seat 35, and up around the stem 47.

When the whipped mix, carrying bubbles as well as gas in solution, reaches the open interior chamber 48 of the nozzle 42 it flows on horizontally through the slightly dropping open nose 49 of the nozzle.

The nozzle 42 has been found satisfactory when found as a white metal die casting with a nose 2 inches long from the center of the plunger, and containing a rectangular passage $\frac{3}{32}$ inch deep and $\frac{3}{8}$ inch wide, the chamber 48 and open nose each having several times the area of the opening in the valve body.

Such an opening yields an excellent aerated mix with about 690% overrun from one-half pint of 35% cream carrying 5% to 6% sugar and 15 to 20 drops vanilla extract, showing little measurable drainage when standing at 40 F. for two hours.

The plunger 46 is shown as sliding in a bore 50 above the chamber 48 of the nozzle 42 and is depressed by pushing down its flat top 51 by the thumb or finger, against the tension of its spring 52. A stop 53, within the chamber 48, soldered to the plunger 46 holds it in the bore 50.

To enable the container to be efficiently and conveniently used in dispensing at a retail store counter, the liquid mix enters the bottom of a tube 54 screwed on to the lower end of the valve body 28 and extending almost to the bottom of the container, with the result that gas pressure above the surface of the liquid shown as a line 55, forces the liquid out through the tube and valve when the plunger 46 is depressed.

In the form shown, the nuts 31 and 32 hold the valve 27 and tube 54 at the depression 30 in a crescent boss 57 rising about $\frac{1}{16}$ of an inch above the flat surface 58 of the cover 17. This boss is nearly ¾ inch wide at the valve, tapering so as to leave a flat circular space nearly 1¾ inches in diameter, thus placing the valve 27 just clear of one edge of the cover 17, and providing a place for a label such as an ordinary milk bottle cap 60 which may be caught under the heel 23 of the ring 16.

The depression 30 is not quite horizontal in the form shown, but as shown begins level with the boss at the outer edge and tilts toward the center of the cover, with the result that the lower end of the tube 54 within the container lies adjacent the nearest point in the outer wall, and its end is over the annular depression 12, just clearing the raised margin 57 of the depression when the cover 17 rests on the body.

When a dispensing counter clerk seizes the container to deliver a little aerated mix, he usually seizes it so that his forefinger lies just under the nozzle 42 while his thumb rests gently on the plunger 46. The container tilts naturally in his hand causing even a thin layer of the contained liquid to gather in the depression 12 at the lower end of the tube 54, so that the liquid flows out when the clerk presses his thumb—almost the last drop flows out.

A pint container weighing, all told, less than a pound and a quarter has been found very satisfactory with a body made of 0.062 inch metal, a top made of 0.035 metal, and a ring made of 0.075 metal. The metal may be tinned by dipping inside and out, and the valve permanently secured in place by solder. To bring the nozzle 42 to the convenient projecting point, there may be interposed between the nozzle 42 and the nut 32 a soft rubber washer 59 adapted to seal the joint.

A cream mix is usually filled in the container to the desired level, the cap put on, the container set with the tube 54 clear of the liquid, and the air flushed out with nitrogen or other non-oxidizing gas, by putting it in under pressure, preferably up to 30 pounds and even up to 100 pounds, and then releasing the gas. It is often useful to repeat the flushing.

One method of charging is to place the container in a combined shaking and charging machine and simultaneously introduce the gas, usually nitrous oxide for cream mixes, and carbon dioxide for other liquids.

A cream mix thus charged keeps longer than uncharged milk—sometimes as much as 21 days.

The container, it will be observed is capable of standing hard usage, and its parts can, even without removing the valve, be cleaned and sterilized almost instantly by a stream of hot water or live steam, with no fear of cracking, as glass would crack. For some purposes it may be advantageous to substitute a Dill valve for the Shrader valve.

Besides being a useful device for dispensing, the form of container illustrated has the advantage that it may roll along on its side from place to place and from operation to operation, without any need to upend or invert it to bring the inner end of the tube 54 above the contained liquid.

It will also be noted that the container may be filled, with various liquids, if desired through the valve with the cover on.

Figures 2, 4:
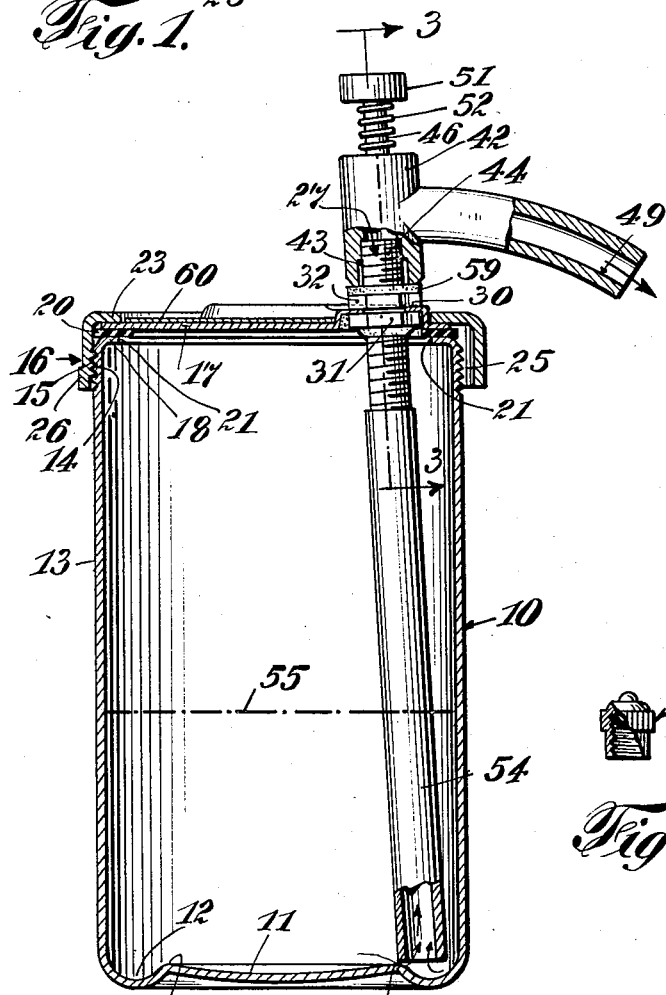
Figure 2 is a side view, largely in section.
Figure 4 is a broken-away view of a cap.
Figure 3:
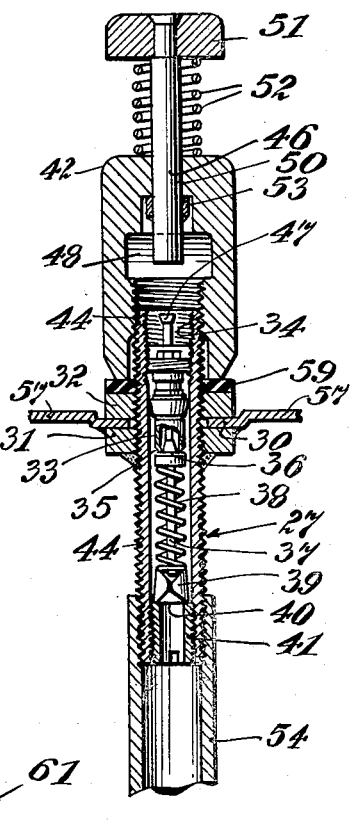
Figure 3 is an enlarged sectional side view of the valve.

When the nozzle 42 is removed the valve may be covered by the usual dust cap 61 shown in Figure 4.

Having thus described certain embodiments of the invention, what is claimed is:

1. A metal container body for edible liquids, a lighter weight cover for the body having a flat surface, a separate device engaging the cover to hold the cover to the body, a valve forming the sole opening to the body, a boss in the cover adapted to strengthen it and carrying the valve adjacent but clear of one edge of the body, and a nozzle for the valve projecting over the side of the body and adapted to serve as a hand hold for the container, a tube projecting from the valve to the point in the can where liquid tends to collect when the container is held by the hand hold, and a depression at the valve pointing the tube to said point.

2. A metal container body for edible liquids, a lighter weight cover for the body having a flat surface, a separate device engaging the cover to hold the cover to the body, a boss in the cover around one edge and shaped to leave the level surface for a label, a separately shaped depression in the boss so as to incline toward the center, a tube carried by the incline to reach the side of the bottom of the container and forming the sole opening to the container, a valve on the tube, and a hand-hold nozzle including a valve release fitting the valve.

3. In a container assembly for dispensing whipped cream, the combination of a container, a closure element for the container, a valve barrel carried by and passing through the closure element, a valve assembly in said barrel and bodily removable as a unit through one end thereof and comprising a valve sleeve mounted in said barrel and having a valve seat on the sleeve, a movable valve member having an actuating stem passing through said sleeve, a spring member on the stem normally maintaining the valve member in engagement with the seat, a siphon tube extending from a part of the barrel on one side of the closure element and forming a continuation of said barrel, a dispensing nozzle having a discharge passage and detachably secured to said barrel on the other side of the closure element, and manually operated means carried by said nozzle and engageable with the valve stem to unseat the valve head against the resistance of the spring member, whereby upon such unseating a gas-charged cream under pressure in the container will discharge through the sleeve and around the stem to initiate expansion to the consistency of whipped cream and to continue such expansion in the discharge passage of the nozzle.

4. In a container assembly for dispensing whipped cream, the combination of a container, a valve barrel carried by and passing through a wall of the container, a valve assembly in said barrel and bodily removable as a unit through one end thereof and comprising a valve guide mounted in said barrel, a movable valve member having an exteriorly accessible actuating stem passing through said guide, a valve seat for said valve member, a spring member normally maintaining the valve member in engagement with the seat, a dispensing nozzle having a discharge passage and detachably secured to said barrel, and manually operated means carried by said nozzle and engageable with the exteriorly accessible valve stem to unseat the valve head against the resistance of the spring member, whereby upon such unseating a gas-charged cream under pressure in the container will discharge around the stem to initiate expansion to the consistency of whipped cream and to continue such expansion in the discharge passage of the nozzle.

5. In an apparatus for whipping cream (or for like purposes) by mixing the cream with a gas under pressure and discharging the same through a constricted passage, a conventional tire air valve including a slender tube having its inner end acting as a valve seat, a pin extending through said tube at both ends, a valve part secured to said pin for bearing against the inner end of said tube, and a return spring coiled about said pin for urging the valve to closed position, the passage through said tube around said pin being a comparatively constricted passage, and the passage between said valve part and valve seat being even more highly constricted when the valve pin is only slightly depressed, said tire air valve acting as an inlet valve when filling the apparatus with gas, and also acting as a constricted passage-way when discharging the cream and gas mixture, a discharge nozzle for guiding the whipped cream from the tire air valve, and means accessible outside the discharge nozzle for slightly depressing the pin of the tire air valve.

6. Apparatus for the whipping of cream or for like purposes, said apparatus comprising a container having a discharge tube leading therefrom, a conventional tire air valve including a slender tube having its inner end acting as a valve seat, a pin extending through said tube at both ends, a valve part secured to said pin for bearing against the inner end of said tube, and a return spring coiled about said pin for urging the valve to closed position, the passage through said tube around said pin being a comparatively constricted passage, and the passage between said valve part and valve seat being even more highly constricted when the valve pin is only slightly depressed, said tire air valve being screwed into said tube with the valve pin projecting outwardly, and control means accessible outside the discharge tube for depressing the valve pin in order to cause the valve to act as a constricted discharge passageway.

7. Apparatus for whipping cream or for like purposes, said apparatus comprising a container which is fully enclosed except for a single pipe leading therefrom, a conventional tire air valve including a slender tube having its inner end acting as a valve seat, a pin extending through said tube at both ends, a valve part secured to said pin for bearing against the inner end of said tube, and a return spring coiled about said pin for urging the valve to closed position, the passage through said tube around said pin being a comparatively constricted passage, and the passage between said valve part and valve seat being even more highly constricted when the valve pin is only slightly depressed, said tire air valve being screwed in said pipe and so faced as to hold gas in the container, a valve pin depressor capable of only limited movement, and an operating handle for moving the depressor in order to cause a limited depression of the valve pin.

8. Apparatus for the whipping of cream or for like purposes, said apparatus comprising a container having a gas inlet tube leading thereinto, a conventional tire air valve including a slender tube having its inner end acting as a valve seat, a pin extending through said tube at both ends, a valve part secured to said pin for bearing against the inner end of said tube, and a return spring coiled about said pin for urging the valve to closed position, the passage through said tube around said pin being a comparatively constricted passage, and the passage between said valve part and valve seat being even more highly constricted when the valve pin is only slightly depressed, said tire air valve being screwed into said tube, with the valve pin projecting outwardly, whereby the valve acts as an inlet valve when charging the container with gas, additional control means for only slightly depressing the valve pin in order to permit the valve to act as a constricted discharge passageway during the ejection of the cream and gas mixture, and a yieldable stop member against which said control means presses and which must be compressed by said control means before said valve pin opens, thereby preventing accidental opening of the valve.

ALLYNE H. SMITH.